Oct. 13, 1970     E. W. HENDERSON     3,533,752

PRESSURE CONTROL IN CARBON BLOCK REACTOR

Filed Dec. 20, 1968     3 Sheets-Sheet 3

INVENTOR.
E.W. HENDERSON

BY

*Jenny & Quigg*
ATTORNEYS

United States Patent Office 3,533,752
Patented Oct. 13, 1970

3,533,752
PRESSURE CONTROL IN CARBON BLACK REACTOR
Eulas W. Henderson, Bartlesville, Okla., assignor to Phillips Petroleum Company, a corporation of Delaware
Continuation-in-part of application Ser. No. 379,905, July 2, 1964. This application Dec. 20, 1968, Ser. No. 786,849
Int. Cl. C09c 1/50
U.S. Cl. 23—259.5      2 Claims

ABSTRACT OF THE DISCLOSURE

The surface area properties of furnace carbon black are controlled by controlling the static pressure within the furnace carbon black reactor.

---

Figure 1:
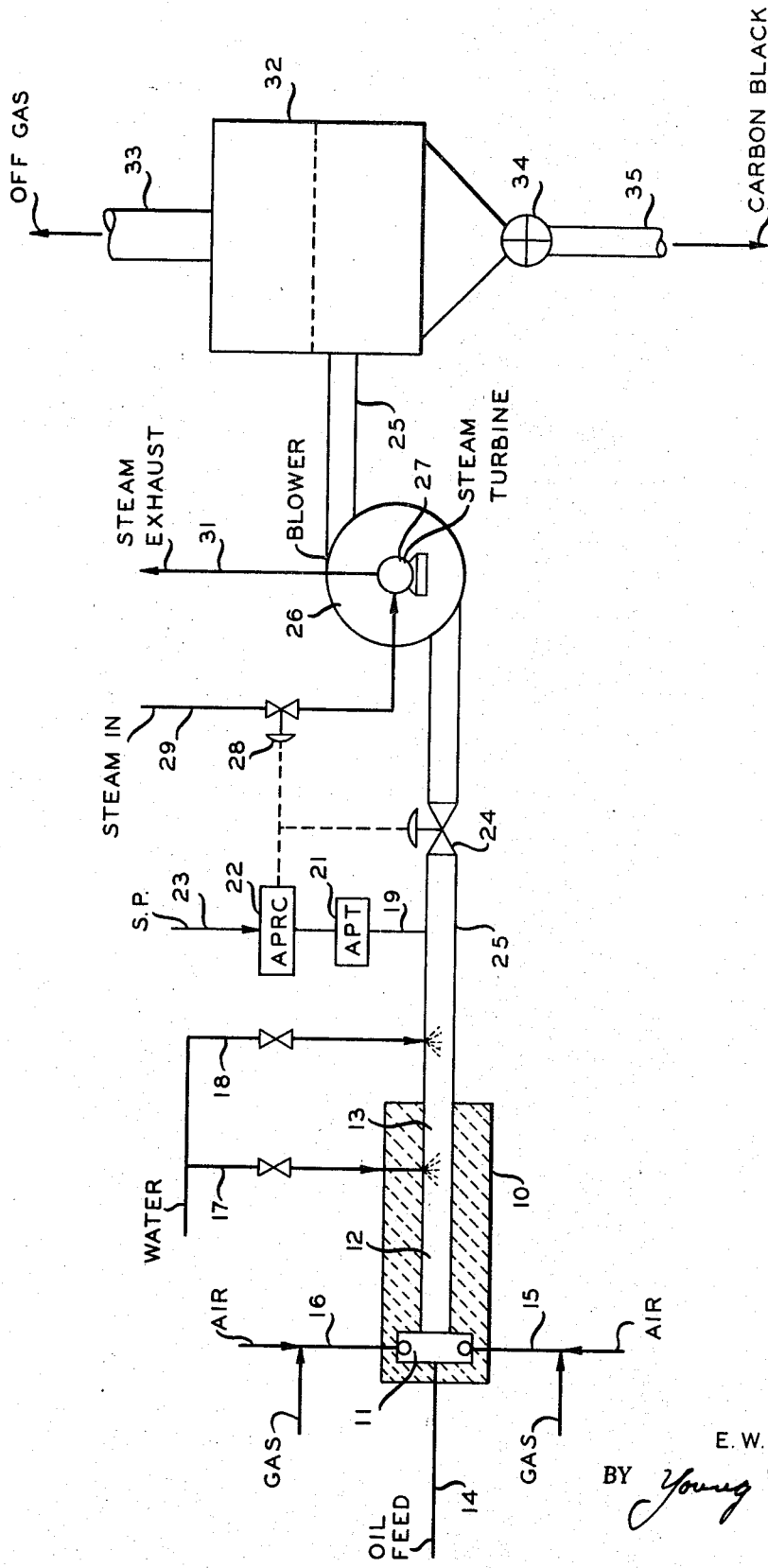

This is a continuation-in-part of my application Ser. No. 379,905, filed July 2, 1964, now abandoned.

This invention relates to the control of the surface area of carbon black during the production of the carbon black. In one aspect this invention relates to a method and means for controlling the surface area of carbon black in the production of furnace carbon black. In another aspect this invention relates to a method and means for operating a furnace carbon black reactor at a constant and predetermined absolute pressure regardless of the ambient atmospheric pressure.

It is known to produce carbon black by contacting a liquid hydrocarbon, for example, a gas oil, in a highly dispersed form, with hot combustion gases in a furnace. One preferred process for producing carbon black by this method uses a reaction system of two cylindrical sections, one short section of large diameter, referred to hereinafter as the "combustion chamber," and an elongated section of considerably smaller diameter, referred to hereinafter as the "reaction chamber." The two chambers are coaxial and in open communication with each other. The combustion is provided with at least one tangential inlet through which a combustible mixture of fuel and oxidant is admitted to form a swirling body of hot combustion gas which travels in a generally helical path into and through the reaction chamber, thus providing a zone maintained at a carbon black forming temperature. A carbonaceous feed injected longitudinally and axially into the combustion chamber reacts to form carbon black. A furnace as above described is disclosed and claimed in U.S. 2,564,700, issued Aug. 21, 1951 to J. C. Krejci and is used to produce HAF (High Abrasion Furnace) types of carbon black. Fuel referred to herein includes any combustible hydrocarbon gas or vaporized hydrocarbon such as a vaporized hydrocarbon oil. By combustion gases is meant such gases as result from the chemical reactions of burning under the particular circumstances existing in the combustion zone. The combustion gases and the reactant hydrocarbon or "make" hydrocarbon pass through the combustion chamber and reaction chamber in a state of sufficient annular separation to prevent carbon deposition on the cylindrical walls thereof. The tangentially added mixture is injected at sufficient velocity to flow spirally inward in the combustion chamber and substantially helically through the reaction chamber. These gases have sufficient centrifugal force to maintain a layer of the combustion gas adjacent the reaction chamber wall and accordingly prevent deposition of carbon upon this wall. The reactant hydrocarbon is converted or decomposed to carbon black by heat transferred to it by mixing at the interface between the hydrocarbon and the combustion gases and/or by radiation. The process is generally referred to as a tangential flame process of the precombustion type. Upon issuing from the reactor, the gaseous effluent carrying the carbon black is cooled, and the carbon black separated therefrom by any usual means old in the art, such as running the effluent through bags to screen out the carbon black, or by running the effluent through an electrical precipitator or through cyclone separators.

The tangential flame, precombustion type reactor described above is generally preferred for the production of HAF, ISAF and SAF types of furnace carbon black because of the excellence of product obtained, other types of reactors are utilized in the production of furnace carbon black, for example, FEF (Fast Extrusion Furnace) black is produced in a reactor, such as that shown in U.S. Pat. 2,375,796, issued May 15, 1945, to J. C. Krejci.

In the production of furnace carbon blacks the operation is conducted so as to control certain specific properties of the carbon black produced such as surface area, structure, pH, and the like. For example, surface area determined by adsorption of nitrogen is a particularly important property of carbon black and is one of the properties used in distinguishing among the various grades of carbon black produced. Thus as illustrative examples Fast Extrusion Furnace (FEF) black has a surface area of about 44 square meters per gram as determined by nitrogen adsorption; High Abrasion Furnace (HAF) black has a surface area of about 76 square meters per gram; Intermediate Super Abrasion Furnace (ISAF) black has a surface area of about 108 square meters per gram; and Super Abrasion Furnace (SAF) black has a surface area of about 136 square meters per gram.

It has been determined that static pressure in the furnace black reactor section of a furnace black plant has a profound effect on the surface area of the carbon black produced. This effect can be controlled or reduced by manipulation of other process variables such as residence time and temperature by increasing or decreasing the volume of the reactor and by changing the ratio of air and gas admitted to the tangential ports of the precombustion chamber as well as varying the total throughput of materials through the reactor. It is not, however, always convenient or desirable to change these operating variables and under some conditions it has not been possible to control the surface area of the carbon black produced without extensive modification of the apparatus employed in producing the furnace carbon black. Furnace carbon black plants situated at various altitudes have required considerable differences in reactor dimensions in order to render the process compatible with the existing altitude.

I have now discovered that the surface area properties of furnace carbon black are particularly sensitive to the pressure within the reactor in the range of about 10 to 15 pounds per square inch absolute (p.s.i.a.). Pressure continues to affect the surface area properties of carbon black in the higher pressure ranges, e.g., 15–45 p.s.i.a., but the effect is not so pronounced and small changes can usually be tolerated because other variables can be adjusted to provide carbon black having the desired surface area properties. I have further discovered that the pressure in the reactor of a furnace carbon black plant can be maintained at a predetermined pressure so as to produce carbon black having substantially constant surface area properties regardless of changes in the atmospheric pressure. I have found that if the pressure in the reactor is maintained constant or substantially constant, other operating variables can be varied over a considerable range of conditions without adversely affecting the surface area properties of the carbon black produced.

Figure 2:
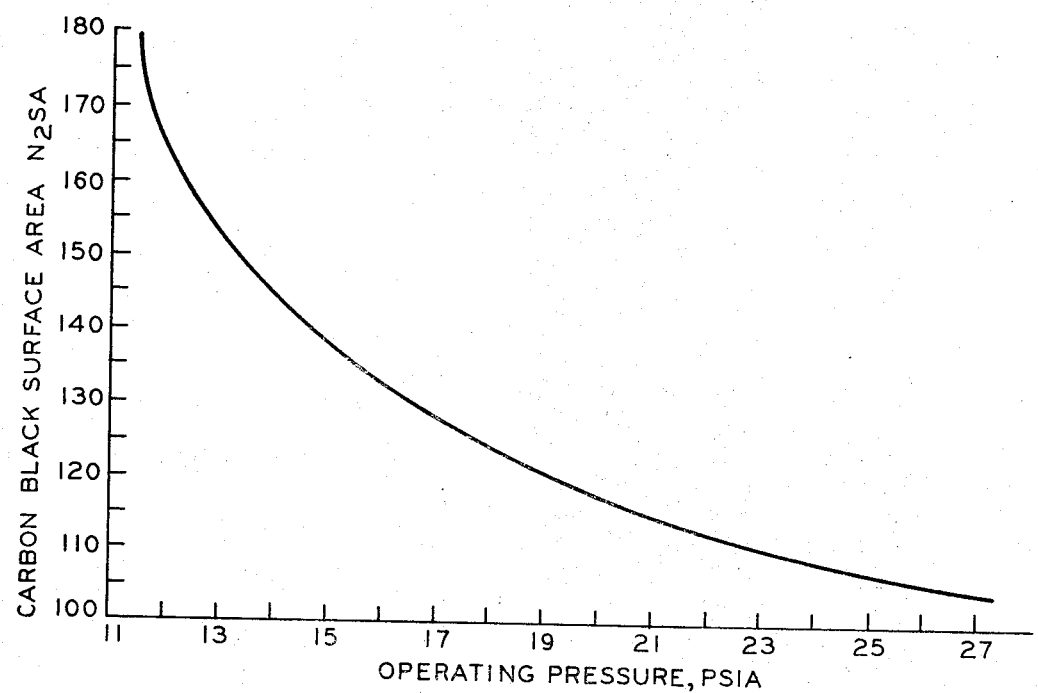
Figure 3:
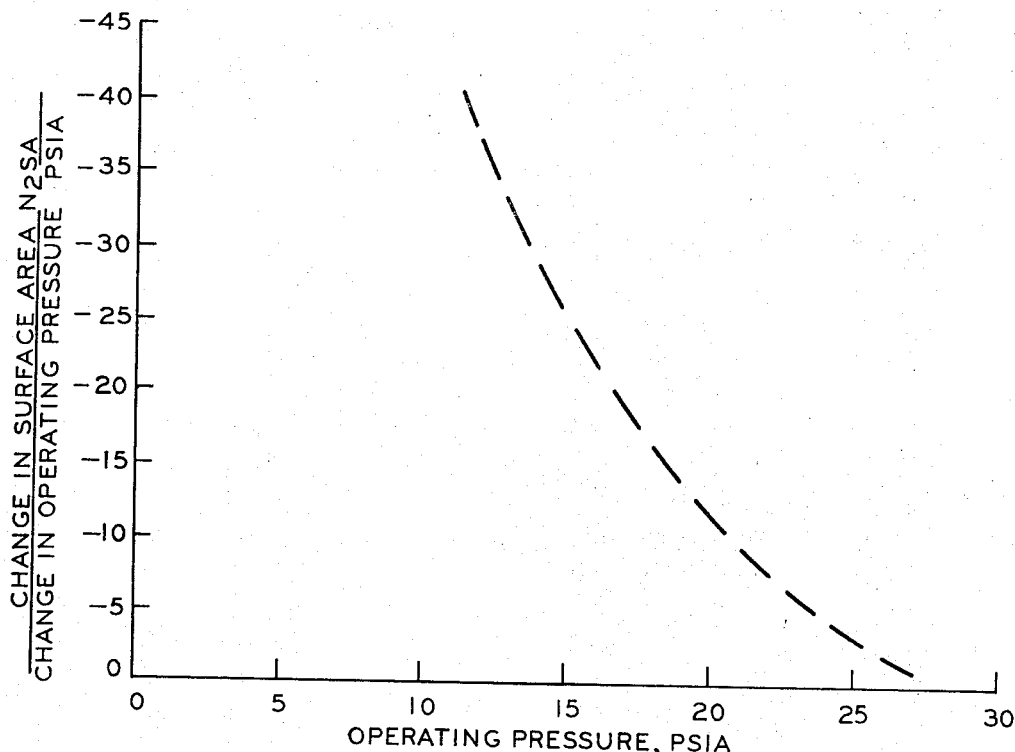
Figure 4:
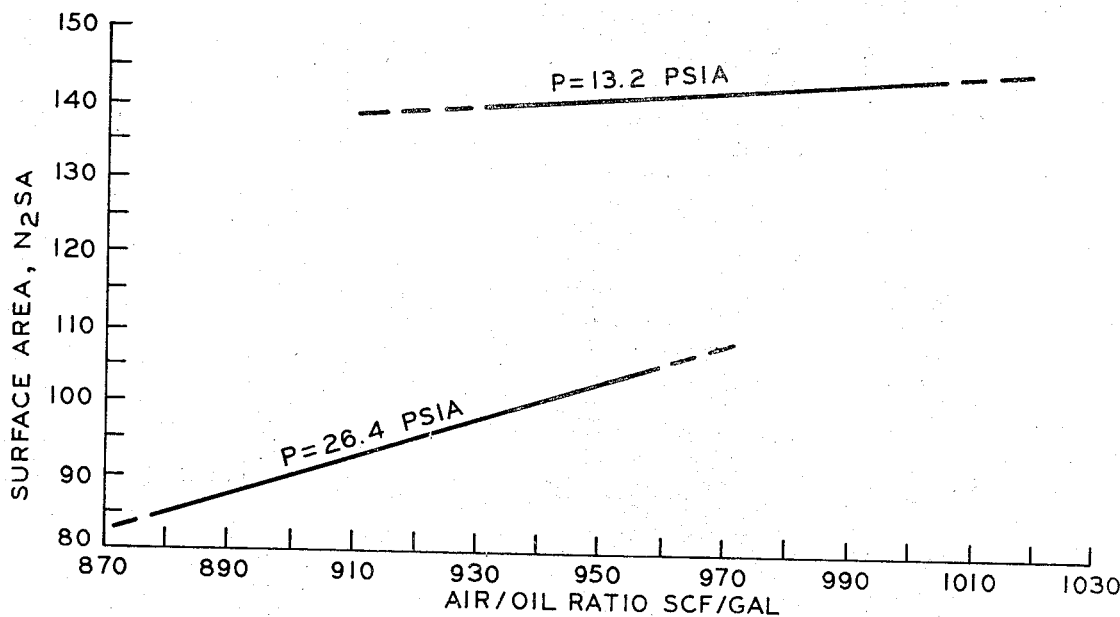
Figure 5:
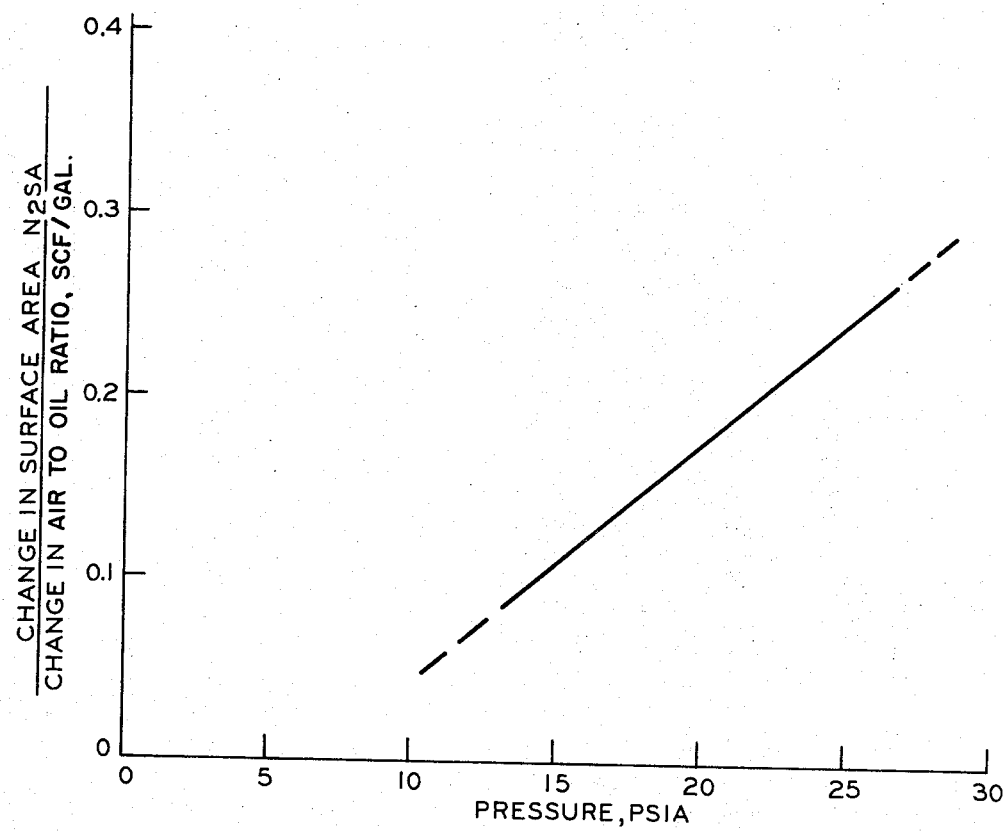

It is an object of this invention to provide a method and means for producing furnace carbon black having substantially constant predetermined surface area properties. It is also an object of this invention to provide a method and means for controlling the pressure in a carbon black reactor at a predetermined, substantially constant value. A further object of this invention is to provide a method and means for operating a furnace carbon black plant at a substantially constant reactor pressure that is less than the normal atmospheric pressure of the situs. Other and further objects and advantages will be apparent to one skilled in this art upon study of the disclosure including the detailed description of the invention and the drawings wherein:

FIG. 1 is a drawing and a schematic flow diagram of a process according to this invention;
FIG. 2 is a graphical representation of data;
FIG. 3 is a graphical representation of data;
FIG. 4 is a graphical representation of data;
FIG. 5 is a graphical representation of data.

The drawing illustrates a carbon black furnace of the tangential flame, precombustion type operated according to the invention and comprises an insulated shell 10 containing a precombustion chamber 11, a reactor section 12 and a quench section 13. Reactant feed which can be oil, gas or a mixture of oil and/or gas and air enters the precombustion chamber axially via conduit 14. A combustible mixture of gas and air in injected tangentially into the precombusion chamber 11 via conduits 15 and 16. Reaction is terminated by a spray of water introduced into the reaction chamber 12 via conduits indicated at 17 and 18. The length of the reaction section is determined by the point of introduction of quench water. A pressure tap 19 senses the absolute pressure in the reactor substantially immediately downstream from the quench section 13 and absolute pressure transmitter 21 transmits a signal representative of the absolute pressure to absolute pressure recorder controller 22. The absoluet pressure to be maintained in the reactor 12 is determined by the position of the set point 23 of controller 22. Downstream from the pressure tap 19, a valve 24 is positioned in the conduit 25 which comprises an uninsulated continuation of the reaction chamber 12 and quench section 13. Valve 24 is operatively connected to absolute pressure recorder controller 22. A blower 26 is also positioned in conduit 25, usually but not necessarily, downstream from valve 24 and is powered by suitable means such as steam turbine 27 or other prime mover. A valve 28 in the steam inlet line 29 is also operatively connected to absolute pressure record controller 22. Exhaust steam from steam turbine 27 is removed via conduit 31. Conduit 25 exits into a carbon black recovery apparatus 32 which can be a filter device from which off-gases are removed via stack 33 and carbon black product is removed via star valve 34 and conduit 35.

A variable pitch propeller fan can be substituted in the conduit 25 for the valve 24 and blower 26. In this modification of the invention the controller 22 will set the pitch of the fan blades in one direction to evacuate or reduce the pressure in the furnace and will set the pitch in the opposite direction to pressurize the furnace. Diaphragm valves similar to 24 and 28 can be used to operate the mechanisms of known variable pitch propeller devices.

The following specific examples will be helpful in attaining an understanding of the invention but the examples are intended to be illustrative and should not be interpreted as unduly limiting the invention.

EXAMPLE I

One specific example of a preferred mode of operating a system illustrated in the drawing will now be described. The absolute recording pressure controller 22 has a set point operative in the range of 10 to 20 p.s.i.a. (pounds per square inch, absolute) and is set at 11.23 p.s.i.a. to provide 11.73 p.s.i.a. in the reactor because there is a 0.5 p.s.i.a. pressure drop from the center of the reactor to the pressure point downstream from the second quench point. The controller supplies instrument air to the diaphragm of valves 24 and 28 in an amount indicated by the relationship of the signal received from absolute pressure transmitter 21 to the valve of the set point 23. Valve 24 is set to be wide open at 9 p.s.i.g. (pounds per square inch, gage) instrument air pressure and to be closed at 3 p.s.i.g. Valve 28 is set to be wide open at 15 p.s.i.g. and closed at 9 p.s.i.g. Thus, when the measured pressure of the reactor is greater than the set point pressure, instrument air to valves 24 and 28 will be increased. When the measured pressure is less than the set point pressure, instrument air to valves 24 and 28 will be decreased.

When atmospheric pressure is 13.3 p.s.i.a., the pressure downstream from blower 26 and upstream from carbon black recovery apparatus 32 (bag filter) will be 13.50 p.s.i.a.

The above is applicable to a 3-inch I.D. reactor, two feet in length having a precombustion chamber 4 inches in length and 8 inches in diameter; 6.24 gal. per hour oil feed; 200 s.c.f.h. (standard cubic feet per hour) jacket air admitted with the oil feed at 14; 400 s.c.f.h. fuel gas admixed with 6000 s.c.f.h. air admitted via conduits 15 and 16. Carbon black is produced at a rate of about 15.8 pounds per hour. The surface area (nitrogen adsorption) is about 173 m.²/gm.

EXAMPLE II

A series of runs was made with a reactor comprising a precombustion chamber 4 inches in length and 8 inches in diameter and a reactor 25 inches in length and 3 inches in diameter. The properties of oil feedstocks used in the runs are shown in Table I. The results of runs made with Feedstock A and Feedstock B are shown in Tables II and III.

TABLE I.—PROPERTIES OF FEEDSTOCKS

| | Feedstock A | Feedstock B |
|---|---|---|
| Aniline Point, ° F | 89.2 | |
| Gravity API | 11.3 | 8.4 |
| Distillation, ° F. at 760 mm.: | | |
| First drop | 540 | 579 |
| 5% | 582 | 609 |
| 10% | 602 | 632 |
| 20% | 619 | 655 |
| 30% | 631 | 674 |
| 40% | 643 | 685 |
| 50% | 657 | 705 |
| 60% | 670 | 724 |
| 70% | 687 | 751 |
| 80% | 714 | 794 |
| 90% | 750 | 869 |
| 95% | | 951 |
| BMCI | 91 | 97.5 |
| Pour Point, ° F | 40 | 45 |
| Viscosity: | | |
| SUS at 100° F | 78.2 | 85.1 |
| SUS at 210° F | 35.7 | 35.6 |
| Ramsbottom carbon residue | 2.6 | 1.1 |
| Carbon content, Wt. percent | 89.0 | 88.9 |
| Hydrogen content, Wt. percent | 9.5 | 9.4 |
| Sulfur content, Wt. percent | 1.5 | 1.4 |
| Loss | | 0.3 |

TABLE II.—CARBON BLACK PRODUCED WITH FEEDSTOCK A

| Run No.: | Pressure, p.s.i.a. | Oil, gal./hr. | Air, m.c.f.h. | Gas, m.c.f.h. | Photelometer | Yield, lb./gal. | Surface area, M²/gm. |
|---|---|---|---|---|---|---|---|
| 1 | 13.2 | 6.67 | 6.12 | 0.4 | 87 | 3.08 | 139 |
| 2 | 13.2 | 5.97 | 6.0 | 0.4 | 88 | 2.64 | 146 |
| 3 | 26.4 | 6.85 | 6.0 | 0.4 | 91 | 3.6. | 84 |
| 4 | 26.4 | 12.40 | 12.0 | 0.8 | 90 | 3.04 | 105 |

TABLE III.—CARBON BLACK PRODUCED WITH FEEDSTOCK B

| | Presure, p.s.i.a | Oil, gal./hr. | Air, m.c.f.h. | Gas, m.c.f.h. | Photelometer | Yield, lb./gal. | Surface area, M²/gm. |
|---|---|---|---|---|---|---|---|
| Run No.: | | | | | | | |
| 5 | 10.89 | 4.28 | 4.0 | 0.267 | 91 | 2.70 | 150 |
| 6 | 13.16 | 4.68 | 4.0 | 0.267 | 90 | 3.44 | 129 |
| 7 | 11.95 | 6.24 | 6.0 | 0.4 | 89 | 2.71 | 164 |
| 8 | 11.73 | 6.24 | 6.0 | 0.4 | 89 | 2.66 | 173 |
| 9 | 13.57 | 6.63 | 6.0 | 0.4 | 92 | 3.05 | 150 |

Comparing Runs 1 and 3, it can be seen that doubling the pressure on the reactor resulted in a decrease in surface area from 139 to 84 m.²/gm. or a total of 55 units per change of 13.2 p.s.i.a. which corresponds to a change of about 4 units per pound of air pressure. In contrast, a comparison of Runs 7 and 8 shows a change of 9 units for a hcange of 0.22 pound in air pressure or a change of about 41 units per pound of air pressure. Thus, in this pressure range a change in reactor pressure will affect the surface of carbon black produced about 10 times as much as a similar change in reactor pressure at about 2 atmospheres of pressure or 26.4 p.s.i.a.

An analysis of the above data for those runs at approximately the same air to oil ratio is as follows:

TABLE IV

| | Air/oil ratio, s.c.f.h./gal. | Operating press., p.s.i.a. | Surface area, N₂SA |
|---|---|---|---|
| Run No.: | | | |
| 4 | 968 | 26.4 | 105 |
| 7 | 962 | 11.95 | 164 |
| 8 | 962 | 11.73 | 173 |

These data have been plotted in FIG. 2 attached. The resulting curve indicates carbon black surface area values in relation to operating pressure in pounds per square inch, absolute. From this curve, FIG. 3 has been prepared. FIG. 3 is a plot of the slope of the curve of FIG. 2 in terms of change in surface area per pound change in operating pressure, versus operating pressure as the abscissa. FIG. 3 indicates that the change in surface area per pound variation in operating pressure in the range of 11–12 pounds operating pressure is about 41. In contrast, this change in the range of about 26.4 pounds is only about 1.67.

In the operation of commercial carbon black processes, within the limits of practical instrumentation, some variation in operating condition is inevitable. In addition, certan natural-occurring variations are almost unavoidable, these being related to feedstock quality, humidity of air and the like. Similarly, some variation in pressure of the system is likely ot be unavoidable. These data indicate that when a carbon black process is being operated subject to such variations and primarily concerned with the surface area characteristics of the carbon black, the process should be operated at as high operating pressures as practically feasible in order to minimize the effect of unavoidable changes in system pressure on carbon black surface area. In other words, because the surface area of carbon black is more sensitive to changes in operating pressure in the lower pressure ranges than it is in the higher pressure ranges, when close surface area control is essential, operations should be conducted in the higher operating pressure ranges of from about 20 to about 30 p.s.i.a., preferably from about 23 to about 27 p.s.i.a.

Again, a comparable analysis of the foregoing data may be made in respect to air-oil ratios as related to operating pressure. This analysis is shown in Table V.

TABLE V

| | Operating pressure, p.s.i.a. | Air to oil ratio, s.c.f./gal. | Surface area |
|---|---|---|---|
| Run No.: | | | |
| 1 | 13.2 | 918 | 139 |
| 2 | 13.2 | 1,005 | 146 |
| 3 | 26.4 | 878 | 84 |
| 4 | 26.4 | 968 | 105 |

Graphical representation of these data are shown in FIG. 4 attached, wherein surface area is related to the air to oil ratio at two reaction pressures. These data indicate, as the prior data did, that the change in surface area varies with the operating pressure involved. Additionally, however, these data indicate that the surface area of a carbon black product, at substantially the same air to oil ratio, is more significantly affected at the higher pressures than at the lower pressures. Alternately expressed, at constant operating pressure, the surface area changes to a greater extent for a small change in air to oil ratio at high pressures than it does at low pressures. This relationship is graphically presented in FIG. 5 in which the change in surface area in respect to the change in air to oil ratio is related to the operating pressure.

Hence, in consideration of unavoidable variations of operating conditions as previously discussed, it is concluded from these data that where surface area variations are desired to be minimized in the carbon black product, but unavoidable changes of the operating air to oil ratio are likely to occur for any reason, including variations in air or oil charge rates, air temperature, barometric pressure, or the humidity of the air, to minimize the effect of such variations, operations are preferably conducted in the operating range of from about 11.5 to about 13 p.s.i.a., more preferably from about 11.5 to about 12.5.

The concepts discussed above may be embodied individually in the operation of carbon black producing processes and in combinations within processes. For example, it may be desirable to operate at the low pressure ranges within certain portions of an operating cycle and then shift to other operating pressures when one or the other property of the carbon black is of principal concern, for example, its structure.

These and other adaptations of the method of this invention will be indicated and are considered as being within the principle and scope of the invention.

The invention is not limited to a HAF reactor but is applicable to FEF and other types of furnace carbon black reactors.

What is claimed is:

1. In a carbon black producing plant comprising a furnace carbon black reactor having an inlet and outlet, and means connected to the outlet to recover carbon black from the reactor effluent, the combination therewith of means to sense the static pressure in the reactor; valve means in the outlet of the reactor; evacuation means in the outlet of the reactor; and control means operatively connected to said means to sense pressure, said valve means and said evacuation means to maintain the pressure in the reactor at a predetermined value.

2. Apparatus for maintaining a predetermined static pressure in a carbon black furnace having an inlet and an outlet comprising a pressure transmitter responsive to the absolute pressure in said furnace; a valve in the outlet of said furnace; a blower positioned in the outlet of said furnace so as to increase the rate of flow of furnace effluent through said outlet; a prime mover operatively connected to said blower; a pressure controller operatively connected to said pressure transmitter, said valve and said prime mover so as to close said valve an amount sufficient to raise the pressure when the pressure in the furnace falls below the set point of the controller and to operate the blower an amount sufficient to lower the pressure when the pressure in the furnace rises above the set point of the controller.

References Cited

UNITED STATES PATENTS

| | | | |
|---|---|---|---|
| 673,185 | 4/1901 | Wegelin | 23—209.8 |
| 1,798,614 | 3/1931 | Matlock | 23—209.8 |
| 1,820,657 | 8/1931 | Francis | 23—209.8 |
| 2,292,355 | 8/1942 | Ayers | 23—209.8 |
| 2,564,700 | 8/1951 | Krejci | 23—209.4 |
| 3,172,729 | 3/1965 | Galocsy et al. | 23—209.4 |
| 3,264,065 | 8/1966 | Schirmer et al. | 23—209.6 |

OTHER REFERENCES

Kirk-Othmer Encyclopedia of Chemical Technology, vol. 3, 1949, pp. 53–57.

EDWARD J. MEROS, Primary Examiner

U.S. Cl. X.R.

23—209.4, 209.6